(12) United States Patent
Schmitt et al.

(10) Patent No.: US 10,491,670 B2
(45) Date of Patent: Nov. 26, 2019

(54) METHOD FOR LOWERING AN ENERGY DEMAND OF A VEHICLE

(71) Applicant: AUDI AG, Ingolstadt (DE)

(72) Inventors: Nicholas Schmitt, Ingolstadt (DE); Christian Al Haddad, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/322,303

(22) PCT Filed: Sep. 19, 2017

(86) PCT No.: PCT/EP2017/073530
§ 371 (c)(1),
(2) Date: Jan. 31, 2019

(87) PCT Pub. No.: WO2018/068999
PCT Pub. Date: Apr. 19, 2018

(65) Prior Publication Data
US 2019/0222641 A1    Jul. 18, 2019

(30) Foreign Application Priority Data

Oct. 10, 2016 (DE) .......................... 10 2016 219 645

(51) Int. Cl.
*H04L 29/08*    (2006.01)

(52) U.S. Cl.
CPC ...... *H04L 67/1025* (2013.01); *H04L 67/1012* (2013.01); *H04L 67/1021* (2013.01); *H04L 67/12* (2013.01)

(58) Field of Classification Search
CPC . H04L 67/1025; H04L 67/1012; H04L 67/12; H04L 67/1021
See application file for complete search history.

(56) References Cited

U.S. PATENT DOCUMENTS 8,729,857 B2    5/2014  Stahlin et al.
10,222,798 B1 *  3/2019  Brady ................. G05D 1/0088
(Continued)

FOREIGN PATENT DOCUMENTS

CN    101639979 A    2/2010
CN    103995749 A    8/2014
(Continued)

OTHER PUBLICATIONS

International Preliminary Report on Patentability directed to related International Patent Application No. PCT/EP2017/073530, completed Sep. 6, 2018, with attached English language translation; 10 pages.

(Continued)

*Primary Examiner* — Michael A Keller
(74) *Attorney, Agent, or Firm* — Sterne, Kessler, Goldstein & Fox, P.L.L.C.

(57) ABSTRACT

The invention relates to a method for distributing a computational load of a master vehicle, in which computing operations that are to be executed in order to solve a predefined task of the master vehicle. The computing operations are divided into task packages, each of which comprises a plurality of computing operations. The task packages are distributed by the master vehicle to a plurality of further vehicles. The computing operations associated with the task packets are carried out by the plurality of further vehicles and respective results of the computing operations associated with the task packets are transmitted to the master vehicle.

17 Claims, 3 Drawing Sheets

(56) References Cited

U.S. PATENT DOCUMENTS

| | | | |
|---|---|---|---|
| 2002/0188384 A1 | 12/2002 | Becker et al. | |
| 2011/0130905 A1* | 6/2011 | Mayer | G07C 5/008 |
| | | | 701/22 |
| 2015/0088352 A1* | 3/2015 | Gunter | B60L 53/14 |
| | | | 701/22 |
| 2015/0200810 A1 | 7/2015 | Vasseur et al. | |
| 2016/0198485 A1 | 7/2016 | Yousefi et al. | |
| 2016/0318476 A1* | 11/2016 | Cogill | B60R 25/30 |
| 2017/0084096 A1* | 3/2017 | Hui | G08G 1/0112 |
| 2017/0364701 A1* | 12/2017 | Struttmann | G06F 21/78 |

FOREIGN PATENT DOCUMENTS

| | | |
|---|---|---|
| DE | 102007045519 A1 | 4/2009 |
| DE | 102009045711 A1 | 4/2010 |
| DE | 102013007676 A1 | 11/2014 |
| DE | 102014225593 A1 | 6/2016 |
| EP | 2164059 A1 | 3/2010 |
| JP | 2007072801 A1 | 3/2007 |

OTHER PUBLICATIONS

International Search Report and Written Opinion of the International Searching Authority directed to related International Patent Application No. PCT/EP2017/073530, dated Nov. 15, 2017, with attached English-language translation; 28 pages.

Grzegorz Chmaj et al., "Distributed Processing Applications for UAV/Drones: A Survey," Author's Copy; 12 pages.

Chinese Application No. 201780039160.9, Office Action dated Jul. 23, 2019; 7 pages.

Chinese Application No. 201780039160.9, Office Action dated Jul. 23, 2019; English Translation from EPO Global Dossier, 7 pages.

* cited by examiner

METHOD FOR LOWERING AN ENERGY DEMAND OF A VEHICLE

TECHNICAL FIELD

The invention relates to a method for distributing a computational load of a master vehicle. The present invention further relates to a computing system comprising a master vehicle and a plurality of further vehicles.

BACKGROUND

Vehicles usually have control devices, which are configured to process complex and large data quantities. In so doing, it can occur that processing the respective data, e.g., performing computing operations on the basis of the respective data, requires a quantity of electricity that, in the case of a vehicle powered by an internal combustion engine, must be laboriously provided by a generator. Since an internal combustion engine is normally used to drive a generator, the computing operations performed by a respective control device ultimately lead to increased fuel consumption by the internal combustion engine of the vehicle in question.

A method emerges from US 2016/0198485 A1 for dividing the computational load of a master vehicle between the master vehicle and a second vehicle that is driving on the same street within communications range of the master vehicle.

A wireless communications system and a server-based method for communications between vehicles is known from DE 10 2007 045 519 A1. By means of unicast and multicast telecommunications, a multitude of effective communications models are provided, which can also be tailored by the evaluation of GPS location information.

DE 10 2009 045 711 A1 discloses a data transmission, power supply and charging device with a data interface that both transmits energy to an energy storage device and transmits driver-specific data via a charging cable or electrical line. The data transmission, power supply and charging device can include a communications unit, which also makes it possible to receive and send data during the journey without an electrical connection.

US 2015/0200810 A1 discloses a mesh network formed from a plurality of vehicles, which are located in spatial vicinity to each other and which communicate with each other wirelessly via radio.

BRIEF DESCRIPTION OF THE DRAWINGS/FIGURES

DETAILED DESCRIPTION

Figure 1:
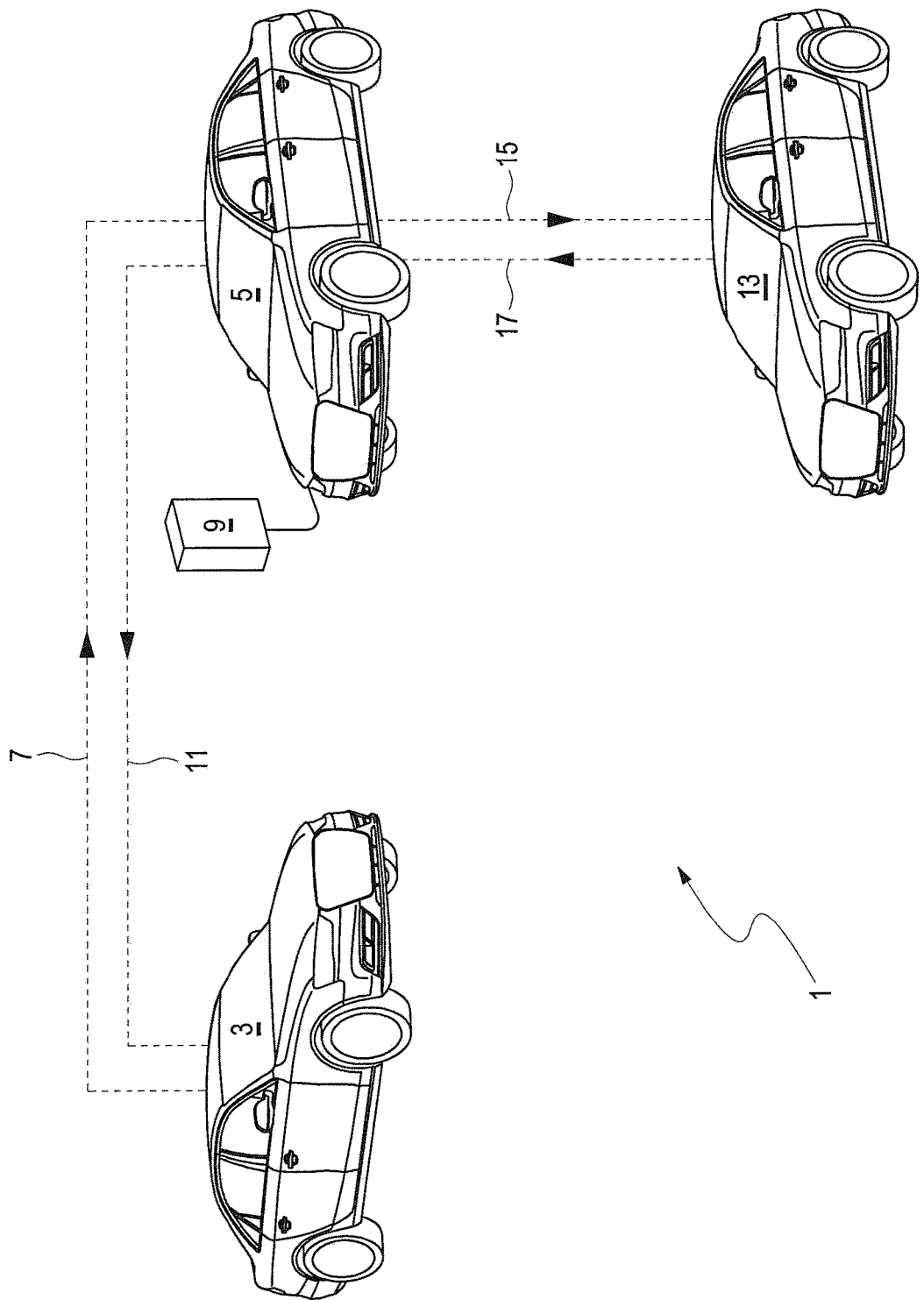
FIG. 1 illustrates a computing system, according to some embodiments of this disclosure.

Before this backdrop, the problem addressed by the invention is that of providing a possibility for reducing an energy demand of a vehicle.

To solve the aforementioned problem, a method is proposed for distributing a computational load of a master vehicle, in which computing operations that are to be executed in order to solve a predefined task of the master vehicle are divided into task packages, each of which comprises a plurality of computing operations, and in which the task packages are distributed by the master vehicle to a plurality of further vehicles, and respective task packages of the task packages are transmitted to respective vehicles from the plurality of further vehicles, and in which computing operations associated with the task packages are carried out by the plurality of further vehicles, and respective results of the computing operations associated with the task packages are transmitted to the master vehicle.

Embodiments of the present invention are found in the description and the dependent claims.

The proposed method serves in particular to reduce the energy demand of a vehicle. To this end, the invention provides that the computing operations required to solve a task, which has been transmitted to a control device of the vehicle, are divided among a system and/or a computing network consisting of a plurality of further vehicles.

In order to divide the various computing operations required to complete a task, such as processing swarm data to control a group of vehicles, from a master vehicle to a system consisting of a plurality of further vehicles, it is provided in particular that the computing operations be divided into a multitude of task packages and that the respective task packages be transmitted to the respective vehicles from the plurality of further vehicles. The respective task packages of the multitude of task packages are processed by the respective vehicles from the plurality of further vehicles. This means that the respective vehicles from the plurality of further vehicles perform the computing operations assigned to the task packages that have been transmitted to them, and they transmit a result of a respective computing operation and/or a result of a respective task package back to the master vehicle. By distributing the computing operations to the plurality of further vehicles, the master vehicle is relieved of the burden of performing the computing operations and consumes correspondingly less energy, since less electricity must be provided by the generator of the vehicle, whereby the fuel consumption of an internal combustion engine of the vehicle is reduced.

In one possible embodiment of the proposed method, it is possible that the plurality of further vehicles is selected from vehicles that are currently in a deactivated state.

Reducing the energy requirements of a master vehicle without doing so at the expense of the respective further vehicles and without burdening their internal combustion engines and/or batteries with providing a quantity of electricity required for the respective computing operations, it can be provided that the vehicles which are selected as further vehicles and which are used to process respective task package and/or respective computing operations associated with a task package are only those that are currently in a deactivated state, i.e., a state in which the vehicle is not moving. In order to recognize deactivated vehicles from a group of vehicles, for example, it is possible that task packages are transmitted to a vehicle only when it has the status "Ignition off" and/or is connected to a charging station. It can also be provided that the respective deactivated vehicles transmit their status to a server, which acts as a central information point for assigning further vehicles to a master vehicle and/or for selecting further vehicles by a master vehicle.

Moreover, it is plausible that data are transmitted to a vehicle only when the vehicle sends a ready signal or has currently saved a ready signal in a central information point, such as a server. For example, it can be provided that, when a vehicle is parked in a garage or parking lot, the vehicle transmits a ready signal, which is received by the master vehicle provided according to the invention. Based on the received ready signal, the master vehicle transmits data associated with the respective task package to the parked vehicle via a mobile radio interface, for example. The parked vehicle calculates the respective computing operations assigned to the task package by means of respective control devices contained in the parked car and sends the results back to the master vehicle, likewise via the mobile radio interface.

In a further possible embodiment of the proposed method, it is provided that the respective task packages are transmitted to a respective vehicle of the plurality of further vehicles by means of a communications interface, such as a charging column, that is connected to the vehicle and is arranged externally relative to the vehicle, i.e., outside a vehicle.

It is especially plausible that, during the parking process, a further vehicle is linked with a communications interface, which is configured to transmit data for carrying out the proposed method. In this way, the communications interface can form a technical unit with, for instance, an element for powering a battery of the further vehicle, and so the further vehicle is automatically made available and/or configured to carry out the proposed method during a charging process.

In a further possible embodiment of the proposed method, it is possible that the distribution of the task packages to the plurality of further vehicles is administered by a control device of the master vehicle.

A control device of the master vehicle or a central server can be used to administer a distribution of the various task packages, for example, to form respective data packages, to send them to the further vehicles, to receive correspondingly calculated results and to integrate them into an overall result.

In a further possible embodiment of the proposed method, it is provided that multiple task packages are transmitted to a server depending upon the availability of respective vehicles from the plurality of further vehicles. In this instance, the computing operations specified by the task packages can be performed by the server and the respective results of the computing operations specified by the task packages can be transmitted by the server to the master vehicle and/or at least one vehicle from the plurality of further vehicles.

So that the burden on a master vehicle can also be relieved in cases where an insufficient number of further vehicles is currently available to carry out the computing operations to be performed to complete a task and/or can be used to perform the computing operations during a specified window of time, it is possible that at least one server is used to perform the computing operations. In order to limit a computing capacity that is to be made available in the form of the at least one server, it is provided in particular that the respective computing operations to be performed are undertaken by the at least one server only when the computing operations currently cannot be processed by the use of one of the further vehicles.

In the proposed method, it is provided that the vehicle is assigned to the plurality of further vehicles as a function of a current time of day and/or a geographical position of the vehicle.

In order to carry out the completion of a task by means of computing operations distributed to a multitude of vehicles, it is possible that only vehicles that are likely to be available for a period of time sufficient to carry out the respective computing operations are selected to be part of the respective distributed computing network, i.e., are assigned to the master vehicle to process the computing operations. In particular, those vehicles that are currently in a time zone in which it is night time can be selected for this purpose so that the probability that a given user would like to use the vehicle and thereby exclude it from use as a further vehicle for performing computing operations is minimized.

Of course, vehicles that are currently in use can also be selected as further vehicles for performing respective computing operations, i.e., vehicles that are currently being moved by the use of an internal combustion engine in particular or an electrical drive, wherein a user of a respective vehicle can exclude the vehicle performing computing operations for other vehicles.

Furthermore, a geographical position can be taken into account when selecting further vehicles. Therefore, vehicles that are located within a given radius around the master vehicle, for example, are particularly well-suited to perform computing operations for a master vehicle, since the master vehicle can communicate especially fast with these vehicles, e.g., within a network, e.g., without the use of relay stations. Naturally, further vehicles used to perform respective computing operations can also be selected according to other criteria, such as membership in a fleet or group.

In a further possible embodiment of the proposed method, it is provided that the results of computing operations of the respective task packages are exchanged among various vehicles from the plurality of further vehicles.

To process complex tasks, as well, it may be necessary for intermediate results to be required to calculate computing operations that are associated with a task package. These intermediate results can be requested from a further vehicle that is to perform the computing operations to establish the intermediate results by a vehicle that is supposed to perform further computing operations on the basis of the intermediate results. Moreover, it is plausible that further vehicles are organized into classes, which perform computing operations either to establish intermediate results or to perform computing operations on the basis of the intermediate results.

In a further possible embodiment of the proposed method, it is provided that a mesh network is formed by the plurality of further vehicles.

A connection in accordance with a mesh network, in which each vehicle is communicatively connected with all other vehicles, possibly via a plurality of further vehicles as relay stations, is suitable for exchanging results and intermediate results between the various further vehicles and the master vehicle.

In a further possible embodiment of the proposed method, it is provided that task packages that are to be transmitted to the plurality of further vehicles are selected according to the energy use required to perform the respective computing operations associated with the task packages.

In order to save the greatest possible amount of energy using the method according to the invention, task packages requiring an especially high computational effort and accordingly requiring especially high energy consumption can be distributed to the further vehicles with a high priority.

The present invention further relates to a computing system with a master vehicle and a plurality of further vehicles, wherein the master vehicle has a control device that is configured to divide the computing operations to be performed by the master vehicle for a predetermined task into task packages and to distribute the task packages to at least some of the plurality of further vehicles and to transmit the respective task packages to at least some of the plurality of further vehicles, and wherein at least those vehicles from the plurality of further vehicles, to which the respective task packages were transmitted, are configured to perform the computing operations associated with the task packages and to transmit the results of the computing operations to the master vehicle.

The proposed computing system serves in particular to carry out the proposed method.

In one possible embodiment of the proposed computing system, it is provided that the computing system comprises at least one server, to which are transmitted the task packages that were not assigned to any vehicle from the plurality of further vehicles. Here, the at least one server is configured to perform the computing operations that are associated with the task packages transmitted to the at least one server and to transmit the results of the computing operations to the master vehicle and/or at least one vehicle from the plurality of further vehicles.

In order to provide a possibility to distribute computing operations that are required for a task of a master vehicle in cases where there are not enough further vehicles to perform computing operations, e.g., calculations, a computing system, such as a plurality of servers, can be provided, which act as an emergency reserve to perform the computing operations.

In a further possible embodiment of the proposed method, it is provided that respective vehicles from the plurality of further vehicles are linked to the master vehicle and/or the at least one server via a communications interface that is external to the respective vehicle. In this instance, the communications interface is configured to provide the vehicle with electricity.

In order for a vehicle that does not have a vehicle-internal communications interface, for example, or that is not configured to carry out the proposed method, to be configured to carry out the proposed method, an external unit can be used which provides the vehicle with the data necessary to carry out the proposed method. The external unit can be configured, for example, as a charging station for an electric vehicle, and so a vehicle that is connected to the charging station to charge automatically becomes a part of the network that supports a respective master vehicle in performing calculation tasks.

In a further possible embodiment of the proposed computing system, it is provided that the control device of the master vehicle is configured to determine the energy consumption required to perform the respective computing operations associated with a task package and to transmit the task packages that are to be transmitted to the plurality of further vehicles to the plurality of further vehicles such that they are prioritized according to their suitability to reduce energy consumption.

To reduce the energy consumption of a master vehicle, it is possible that an energy consumption for the respective computing operations is determined and, based on the determined energy consumptions, is evaluated for various computing operations as to whether a distribution of the computing operations to further vehicles is energetically practical. If the distribution of the various computing operations is energetically practical, e.g., leads to the conservation of energy, the respective computing operations and/or corresponding task packages can be sorted according to a corresponding quantity of energy to be conserved and are accordingly prioritized and transmitted to the further vehicles.

Further advantages and embodiments arise from the description and the attached drawing.

It is understood that the features described above and those to be addressed below can be used not only in the respectively disclosed combinations but rather also in other combinations or alone, without thereby departing from the scope of the present invention.

The invention is schematically represented on the basis of embodiments in the drawing and is schematically and extensively described with reference to the drawing.

FIG. 1 shows a possible embodiment of the computing system according to the invention.

Figure 2:
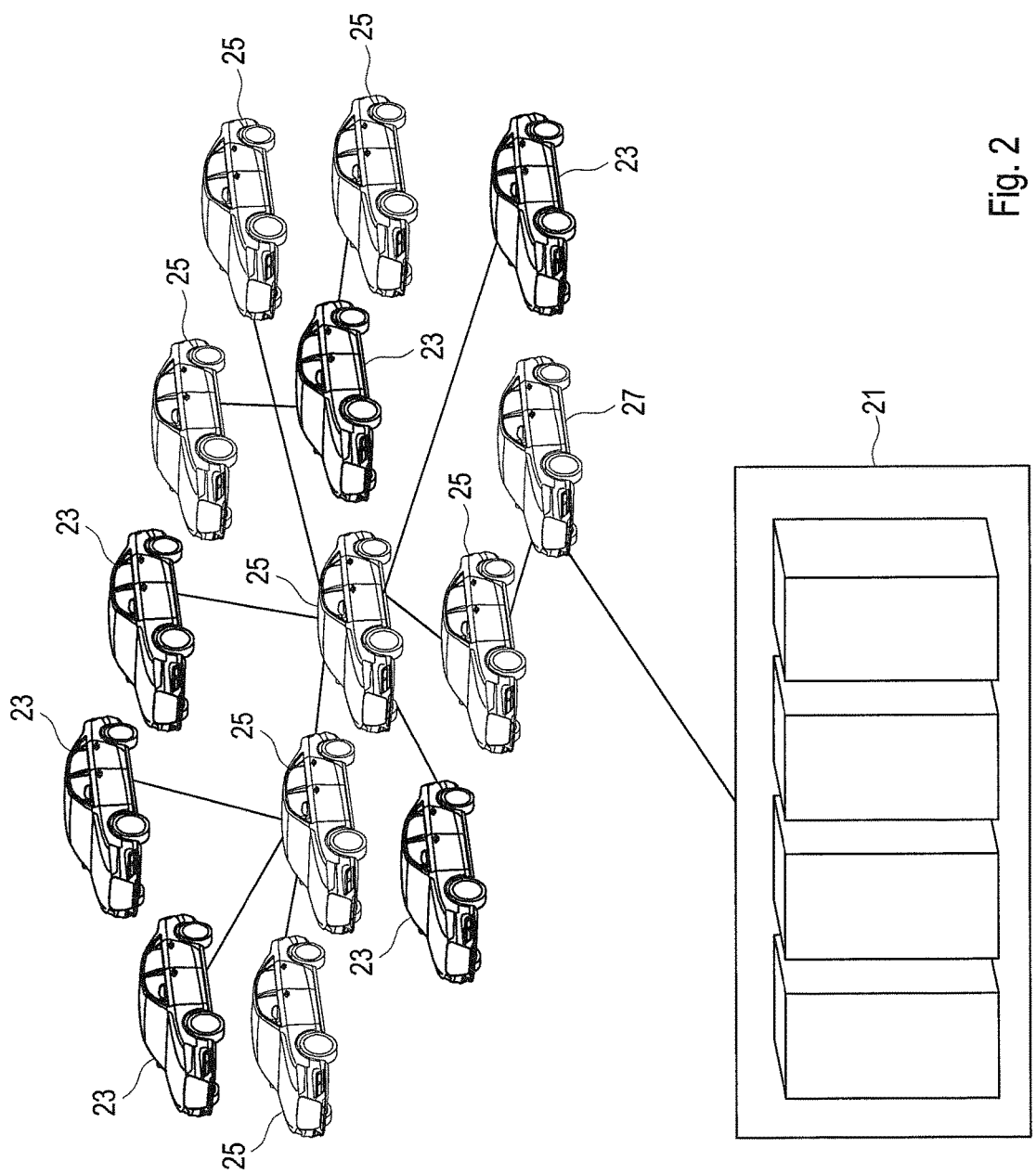
FIG. 2 illustrates another computing system, according to some embodiments of this disclosure.

FIG. 2 shows a further possible embodiment of the computing system according to the invention.

Figure 3:
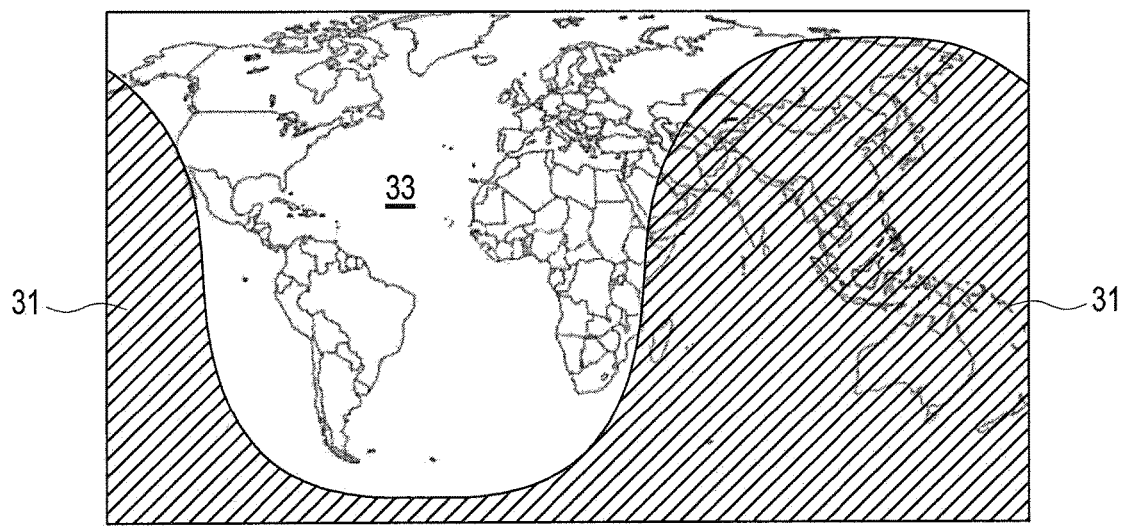
FIG. 3 illustrates a selection criterion for selecting vehicles for implementing a method, according to some embodiments of this disclosure.

FIG. 3 shows a selection criterion for selecting vehicles for implementing a possible embodiment of the method according to the invention.

A computing system comprising a master vehicle 3 and further vehicles 5 and 13 is represented in FIG. 1. The master vehicle 3 performs a multitude of computing operations in order, for example, to calibrate a technical system. If all computing operations were performed by one control device of the master vehicle 3, the control device would exhibit a high consumption of electricity. In order to supply an accordingly large quantity of electricity to the control device, an internal combustion engine in the master vehicle 3 would have to drive a generator and consume a corresponding large amount of fuel, or a correspondingly high demand would be placed on a battery.

To reduce an energy consumption of the master vehicle 3, it is provided that the computing operations that are to be performed by the control device of the master vehicle 3 are distributed at least partially to the further vehicles 5 and 13. To this end, the master vehicle 3 divides the computing operations to be performed into task packages and transmits the data required to process each respective task package, together with a corresponding computer statement, to the further vehicle 5, as indicated by arrow 7. The further vehicle 5 is selected from a plurality of further vehicles depending upon an activity status of a drive in the further vehicle 5.

Since the further vehicle 5 is currently in an idle state, as is indicated by a connection to a charging station 9, the further vehicle 5 is suitable in an especially advantageous way to perform the computing operations for the master vehicle 3. If the further vehicle 5 requires electrical energy to perform computing operations in order to process the respective task packages transmitted from the master vehicle, the further vehicle 5 can draw electrical energy via the charging station 9.

As soon as the further vehicle 5 has completed the computing operations for a given task package, the further vehicle 5 transmits the corresponding results back to the master vehicle 3, as is indicated by arrow 11.

If the further vehicle 5 cannot perform the computing operations for processing respective task packages within a timeframe specified by the master vehicle 3, for example, or if the further vehicle 5 is activated during the computing operations in question, i.e., it is brought into a running state in which the further vehicle 5 itself requires the computing capacity of its control device, then the further vehicle 5 transmits the task packages that still need to be calculated to further vehicle 13, as is indicated by arrow 15.

As soon as this further vehicle 13 has completed the computing operations for a given task package, further vehicle 13 transmits the corresponding results back to the master vehicle 3 or to further vehicle 5, as is indicated by arrow 17, so that further vehicle 5 can transmit the results to the master vehicle 3, as is indicated by arrow 11.

A network consisting of a multitude of vehicles 23 and 25, a master vehicle 27 and a server network 21 is represented in FIG. 2. Vehicles 23 are activated vehicles, meaning vehicles that are currently in use, whereas vehicles 25 are deactivated and are parked, for instance, in a parking lot.

To carry out the proposed method, it is provided in particular that only deactivated vehicles 25 are accessed to perform the computing operations for a respective master vehicle. If the number of deactivated vehicles 25 is insufficient to perform computing operations in a specified timeframe, it is provided that task packages that have not been distributed to deactivated vehicles 25 are transmitted to the server network 21 and processed there.

To transmit the data required to perform the computing operations, it is provided in particular that vehicles 23 and 25 are linked both to one another and to a respective master vehicle 27 by means of wireless communications, such as in a mesh network. For example, it is possible that the master vehicle 27 is actively communicatively connected with the server network 21 and/or with at least some of the vehicles 25, e.g., it exchanges data with the vehicles 25, via a radio data interface using a so-called "5G standard" with data rates of up to 10,000 Mbit/s.

Distributing computing operations to the vehicles 25 and/or to the server network 21 permits the computing operations to be performed quickly with a high degree of reliability. As a result of the multiple and/or redundant distribution of the computing operations to various vehicles 25 and/or to the server network 21, the reliability can be maximized as needed, for example for especially safety-critical tasks.

A distribution of daylight over a map of the earth is represented in FIG. 3. To carry out the proposed method, it is provided in particular that vehicles that are currently located in a zone 31 that is not receiving daylight be selected as further vehicles for performing computing operations for a master vehicle, since there is a higher probability that deactivated vehicles are located in the zone 31 not currently receiving daylight than is to be expected in a zone 33 that is receiving daylight.

The invention claimed is:

1. A method for distributing a computational load of a master vehicle, the method comprising
    dividing computing operations, which are to be executed in order to solve a predefined task of the master vehicle, into task packages, wherein each of the task packages comprises a plurality of computing operations;
    distributing, by the master vehicle, the task packages to a plurality of further vehicles, wherein respective task packages are transmitted to respective vehicles of the plurality of further vehicles, and wherein the computing operations associated with the task packages are carried out by the plurality of further vehicles; and
    receiving, by the master vehicle, respective results of the computing operations associated with the task packages,
    wherein the plurality of further vehicles are selected from vehicles that are currently in a deactivated state, which comprises a state in which the vehicles are not moving, and
    wherein the respective deactivated vehicles are configured to transmit their status to a server, which operates as a central information point for the selection of the plurality of further vehicles by the master vehicle.

2. The method according to claim 1, wherein the plurality of further vehicles are selected from vehicles that are connected to a charging station.

3. The method according to claim 1, wherein the distributing the task packages to the plurality of further vehicles is administered by a control device of the master vehicle.

4. The method according to claim 1, wherein the distributing the task packages to the plurality of further vehicles comprises:
    distributing, from the master vehicle, the task packages to the server, wherein the task packages are then distributed from the server to the plurality of further vehicles administered by the server.

5. The method according to claim 1, wherein the respective task packages are transmitted to the respective vehicles of the plurality of further vehicles using a communications interface that is connected to the respective vehicles and is arranged externally relative to the respective vehicles.

6. The method according to claim 1, further comprising:
    transmitting the task packages to the server in response to a number of available further vehicles being below a minimum number, wherein the computing operations associated with the task packages are performed by the server; and
    receiving, by the master vehicle; the respective results of the computing operations associated with the task packages.

7. The method according to claim 1, further comprising:
    transmitting the task packages to the server in response to a number of available further vehicles being below a minimum number, wherein the computing operations associated with the task packages are performed by the server,
    wherein the respective results of the computing operations associated with the task packages are sent back to at least one vehicle from the plurality of further vehicles.

8. The method according to claim 1, wherein the results of computing operations of the respective task packages are exchanged among vehicles from the plurality of further vehicles.

9. The method according to claim 8, wherein a mesh network is formed by the plurality of further vehicles.

10. The method according to claim 1, further comprising:
    selecting the task packages that are to be transmitted to the plurality of further vehicles based on an energy use required to perform the respective computing operations associated with the task packages.

11. A computing system comprising:
    a master vehicle; and
    a plurality of further vehicles,
    wherein the master vehicle comprises a control device that is configured to:
        divide computing operations, which are to be performed by the master vehicle for a predetermined task, into task packages;
        distribute the task packages to at least some of the plurality of further vehicles, wherein the at least some of the plurality of further vehicles, to which the respective task packages were transmitted, are configured to perform computing operations associated with the task packages; and
        receive results of the computing operations associated with the task packages,
    wherein the control device of the master vehicle is configured to select the plurality of further vehicles from vehicles that are currently in a deactivated state, which comprises a state in which the vehicles are not moved, and
    wherein the respective deactivated vehicles are configured to transmit their status to a server, which operates as a central information point for the selection of further vehicles by the master vehicle.

12. The computing system according to claim 11, further comprising:
the server configured to receive task packages that were not assigned to any vehicle from the plurality of further vehicles, wherein the server is configured to perform computing operations associated with the task packages transmitted to the server and to transmit results of the computing operations to the master vehicle or to at least one vehicle from the plurality of further vehicles.

13. The computing system according to claim 11, wherein the respective vehicles from the plurality of further vehicles are linked to the master vehicle or to the server via a communications interface that is external to the respective vehicles, and wherein the communications interface is configured to supply the respective vehicles with electricity.

14. The computing system according to claim 11, wherein the control device of the master vehicle is configured to select the plurality of further vehicles from vehicles that are connected to a charging station.

15. The computing system according to claim 11, wherein to distribute the task packages to at least some of the plurality of further vehicles, the control device of the master vehicle is configured to distribute the task packages to the server, wherein the task packages are then distributed from the server to the at least some of the plurality of further vehicles administered by the server.

16. The computing system according to claim 11, wherein the control device of the master vehicle is further configured to:
transmit the task packages to the server in response to a number of available further vehicles being below a minimum number, wherein the computing operations associated with the task packages are performed by the server; and
receive, by the control device of the master vehicle, the results of the computing operations associated with the task packages.

17. The computing system according to claim 11, wherein the control device of the master vehicle is configured further to:
transmit the task packages to the server in response to a number of available further vehicles being below a minimum number,
wherein the computing operations associated with the task packages are performed by the server, and
wherein the results of the computing operations associated with the task packages are sent back to at least one vehicle from the plurality of further vehicles.

* * * * *